(12) United States Patent
Bezos et al.

(10) Patent No.: US 7,006,989 B2
(45) Date of Patent: *Feb. 28, 2006

(54) COORDINATING DELIVERY OF A GIFT

(75) Inventors: Jeffrey P. Bezos, Seattle, WA (US); Sheldon J. Kaphan, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/194,602

(22) Filed: Jul. 12, 2002

(65) Prior Publication Data

US 2002/0178089 A1 Nov. 28, 2002

Related U.S. Application Data

(60) Division of application No. 09/151,617, filed on Sep. 11, 1998, which is a continuation-in-part of application No. 09/046,503, filed on Mar. 23, 1998, now abandoned, and a continuation-in-part of application No. 08/928,951, filed on Sep. 12, 1997, now Pat. No. 5,960,411.

(51) Int. Cl.
   *G06F 17/00* (2006.01)
(52) U.S. Cl. ........................................... 705/26
(58) Field of Classification Search .................. 705/26, 705/27, 461, 401; 707/10; 364/479; 700/233
   See application file for complete search history.

(56) References Cited

U.S. PATENT DOCUMENTS

4,937,863 A    6/1990   Robert et al.

(Continued)

FOREIGN PATENT DOCUMENTS

EP    0845747   6/1998

(Continued)

OTHER PUBLICATIONS

"PerlShop ™ Manual", ARPAnet Corp, Copyrighted 1996.*
Pack, Thomas, "All About Books Online," Online, Inc., vol. 20, No. 1, pp. 12-13, 16-21, Feb.-Mar. 1997.

(Continued)

*Primary Examiner*—Wynn W. Coggins
*Assistant Examiner*—R. E. Rhode
(74) *Attorney, Agent, or Firm*—Perkins Coie LLP

(57) ABSTRACT

A method in a computer system for coordinating the delivery a gift given by a gift giver to a recipient when the gift giver did not provide sufficient delivery information. The gift delivery system initially receives an order from the gift giver. The order identifies a gift to be delivered to the recipient and has contact information describing the recipient. The gift delivery system stores the received order in an order database along with an order tracking number. The gift delivery system then determines whether sufficient delivery information has been provided by the recipient. If the delivery information is not sufficient, the gift delivery system sends a communications to the recipient based on the contact information. The communications requests delivery information for the gift. The communications preferably includes the order tracking number so that the recipient can include the order tracking number in a response to the communications. When the recipient does not respond to the communications, the gift delivery system attempts to collect additional information that may be relevant to the recipient from various databases. When the delivery information is sufficient, the gift delivery system verifies whether the potential delivery information is valid. When the delivery information has been verified as being valid, the gift delivery system sends the gift based on the delivery information and notifies the gift giver that the gift has been sent to the recipient. In this way, the gift giver can send the gift to recipients even when the gift giver does not know or provide sufficient delivery information.

42 Claims, 9 Drawing Sheets

U.S. PATENT DOCUMENTS

| | | | |
|---|---|---|---|
| 5,204,897 | A | 4/1993 | Wyman |
| 5,260,999 | A | 11/1993 | Wyman |
| 5,451,998 | A | 9/1995 | Hamrick |
| 5,513,117 | A * | 4/1996 | Small .................... 700/233 |
| 5,515,268 | A | 5/1996 | Yoda |
| 5,627,940 | A | 5/1997 | Rohra et al. |
| 5,640,501 | A | 6/1997 | Turpin |
| 5,640,577 | A | 6/1997 | Scharmer |
| 5,664,111 | A | 9/1997 | Nahan et al. |
| 5,710,887 | A | 1/1998 | Chelliah et al. |
| 5,715,314 | A | 2/1998 | Payne et al. |
| 5,715,399 | A | 2/1998 | Bezos |
| 5,727,163 | A | 3/1998 | Bezos |
| 5,737,729 | A * | 4/1998 | Denman .................... 705/401 |
| 5,813,006 | A * | 9/1998 | Polnerow et al. ............ 707/10 |
| 5,860,068 | A * | 1/1999 | Cook .................... 705/26 |
| 5,870,716 | A | 2/1999 | Sugiyama et al. |
| 5,870,717 | A * | 2/1999 | Wiecha .................... 705/26 |
| 5,897,622 | A | 4/1999 | Blinn et al. |
| 5,970,474 | A * | 10/1999 | LeRoy et al. ................ 705/27 |
| 6,035,283 | A | 3/2000 | Rofrano |
| 6,085,170 | A * | 7/2000 | Tsukuda .................... 705/26 |
| 6,101,482 | A | 8/2000 | DiAngelo et al. |
| 6,101,483 | A | 8/2000 | Petrovich et al. |
| 6,125,352 | A * | 9/2000 | Franklin et al. ............. 705/26 |
| 6,484,150 | B1 * | 11/2002 | Blinn et al. .................... 705/26 |

FOREIGN PATENT DOCUMENTS

| | | |
|---|---|---|
| EP | 0855659 | 7/1998 |
| EP | 0855687 | 7/1998 |
| EP | 0883076 | 12/1998 |
| EP | 0902381 | 3/1999 |
| WO | WO 98/17042 | * 4/1998 |

OTHER PUBLICATIONS

Pereira P. Computer Reseller News n667, "Life Wire: Enhanced Website Key Access Graphics Plan," Jan. 22, 1996 (pp. 105, 107).

Business Wire p04281561-Apr. 28, 1998—"Modcomp Provides ViewMax Most to Web Integration Solution for VWR Scientific Products: Internet Electronic Commerce System,".

Jones, Chris, "Java Shopping Cart and Java Wallet; Oracles Plans to Join e-Commerce Initiative," mar. 31, 1997, InfoWorld Media Group.

"Pacific Coast Software Software Creates Virtual Shopping Cart," Sep. 6, 1996, MC Communications Ltd 1996.

"Software Creates Virtual Shopping Cart," Sep. 5, 1996, Business Wire, Inc.

Baron, Chris and Weil, Bob, "Implementing a Web Shopping Cart," Dr. Dobb's Journal, Sep. 1996, pp. 64, 66, 68-69 and 83-85.

Terdoslavich, William, "Java Electronic Commerce Framework," Computer Reseller News, Sep. 23, 1996, CMP Media, Inc., 1996 (p. 126) http://www.elibrary.com/getdoc.cgi?id=117852032x0y1781w4&OIDS=0Q001D002&Form=RL&pubname=Computer_Reseller_News&Puburl=http~C~~S~~S~www.techweb.com&Querydocid=002269@library_d&Dtype=0~0&dinst=0 [Accessed Nov. 19, 1998].

Hoque, Reaz, "A Shopping Cart Application with Java Script," Web Techniques, May 1998, (pp. 63, 65-66 and 68).

"Internet Access: Disc Distributing Announces Interactive World Wide," Cambridge Work-Group Computing Report, Cambridge Publishing, Inc. 1995 http://www.elibrary.com/getdoc.cgi?id=117852032x0y1781w4&OIDS=0Q003D019&Form=RL&pubname=RL&putname+Cambridge_WorkGroup_Computing_Report&puburl=0&querydocid=1007497@library_b&dtype=0~0&dinst=0 [Accessed Nov. 19, 1998].

Nance, Barry, "Reviews: A Grand Opening for Virtual Storefront with Middleware," Jun. 1, 1997, CMP Media, Inc., 1997 (p. 80) http://www.elibrary.com/getdoc.cgi?id=117852032x0y1781w4&OIDS=0Q005D05&Form=RL&pubname=RL&pubname=Network_Computing&puburl=http~C~~S~~S~www.techweb.com&querydocid=1257247@library_a&dtype=0~0&dinst=0 [Accessed Nov. 19, 1998].

* cited by examiner

COORDINATING DELIVERY OF A GIFT

CROSS-REFERENCE TO RELATED APPLICATION

This application is a divisional of U.S. patent application Ser. No. 09/151,617 filed on Sep. 11, 1998, which is a continuation-in-part of U.S. patent application Ser. No. 09/046,503 filed on Mar. 23, 1998, now abandoned, and U.S. patent application Ser. No. 08/928,951 filed on Sep. 12, 1997 (now U.S. Pat. No. 5,960,411 issued Sep. 28, 1999), the disclosures of which are hereby incorporated by reference in their entirety.

TECHNICAL FIELD

The present invention relates generally to computer-based order entry and delivery.

BACKGROUND OF THE INVENTION

The Internet comprises a vast number of computers that are interconnected for the purpose of exchanging information. Various protocols, such as the HyperText Transfer Protocol ("HTTP"), have been defined to aid in this exchange of information. The HTTP protocol provides a way to identify various resources (e.g., files) that are accessible through the Internet. The World Wide Web ("WWW") is a subset of the Internet that supports the exchange and display of information that is stored in a format known as the HyperText Markup Language ("HTML"). The WWW allows a server computer, called a Web site, to send HTML documents to client computers. These HTML documents are referred to as Web pages. When a client computer receives a Web page, the client computer, typically under control of a Web browser, uses the content of the HTML document to generate a display for the Web page. These Web pages may contain regions through which a user at a client computer can input information to be transmitted to the server computer. When the server computer receives such information, it can customize the appearance of the Web page that is to be displayed next to the user. In this way, a transaction between a server computer and a client computer can involve the display of multiple Web pages.

One of the benefits of WWW is that it facilitates such transactions generally and in particular, transactions relating to electronic commerce. For example, a user can use the WWW to purchase items, such as a computer game, by selecting the item, paying for the item, and downloading the item to the client computer through a series of Web pages. In addition, the WWW may be used to purchase items that can be delivered through normal distribution channels (e.g., U.S. Postal Service). For example, a user may browse a Web page that lists various items, such as books, that may be purchased. The purchaser selects the items that are to be purchased, provides electronic billing information, and provides delivery information identifying the destination at which the items are to be delivered to the purchaser. The delivery information generally includes the full name and address of the purchaser. The items are then sent to the purchaser at the address specified by the provided delivery information. Of course, since purchasers generally know their own names and addresses, they can be expected to provide correct and complete delivery information. If, however, the purchaser does not provide sufficient delivery information, then the items cannot be properly delivered, and the order generally will not be accepted by the Web page.

Alternatively, the purchaser may desire to have the items delivered to a third party as a gift. In such an instance, the purchaser must provide sufficient delivery information for the gift recipient in order for the gift to be delivered successfully. Unfortunately, gift givers do not always know the delivery information for gift recipients. For example, a gift giver who is purchasing a gift for a recipient who has only been contacted via electronic mail may only know the recipient's name and electronic mail address. Thus, the gift giver cannot provide sufficient delivery information. Further, even when the gift giver has or can obtain complete delivery information for the recipient, it is often inconvenient and burdensome for the gift giver to provide this information. Again, such an order lacking sufficient delivery information will generally not be accepted by the Web page. In view of the foregoing, it would be desirable to have a computer system that would support the delivery of gifts even when sufficient delivery information is not provided.

SUMMARY OF THE INVENTION

The present invention coordinates the delivery a gift given by a gift giver to a recipient when the gift giver did not provide sufficient delivery information. The invention can therefore coordinate the delivery of a gift whose order specifies insufficient delivery information, or even no delivery information, for the recipient. In a preferred embodiment, a gift delivery system initially receives an order from the gift giver. The order identifies a gift to be delivered to the recipient and has contact information specifying how to contact the recipient. The gift delivery system stores the received order in an order database along with an order tracking number. The gift delivery system then determines whether sufficient delivery information has been provided for the recipient. If the delivery information is not sufficient, the gift delivery system sends a communications to the recipient based on the contact information. The communications requests delivery information for the gift. The communications preferably includes the order tracking number so that the recipient can include the order tracking number in a response to the communications. If the recipient does not respond to the communications, the gift delivery system attempts to collect additional information that may be relevant to the recipient from various databases. When the delivery information is sufficient, the gift delivery system verifies whether the potential delivery information is valid. When the delivery information has been verified as being valid, the gift delivery system sends the gift based on the delivery information and notifies the gift giver that the gift has been sent to the recipient. In this way, the gift giver can send the gift to recipients even when the gift giver does not know or provide sufficient delivery information.

DETAILED DESCRIPTION OF THE INVENTION

The present invention provides a computer-based method and system for coordinating the delivery of gifts by receiving gift orders, collecting additional delivery information that is not specified in the gift orders, and delivering gifts based on the additional delivery information. In one embodiment, the gift delivery system of the present invention receives gift orders via Web pages provided on the WWW. The gift orders specify a gift that is to be delivered to a recipient. The recipient may be identified by information that does not include the delivery address of the recipient. For example, the recipient may be only identified by a name and contact information such as an electronic mail address or a telephone number. The gift delivery system attempts to contact the recipient to obtain sufficient delivery information. If the contact is not successful, the gift delivery system searches various databases of information to identify additional contact information. If sufficient delivery information is obtained, the gift is delivered to the recipient and the gift giver is notified accordingly. If, however, sufficient delivery information cannot be obtained, the gift giver is notified that the gift cannot be delivered.

Figure 1:
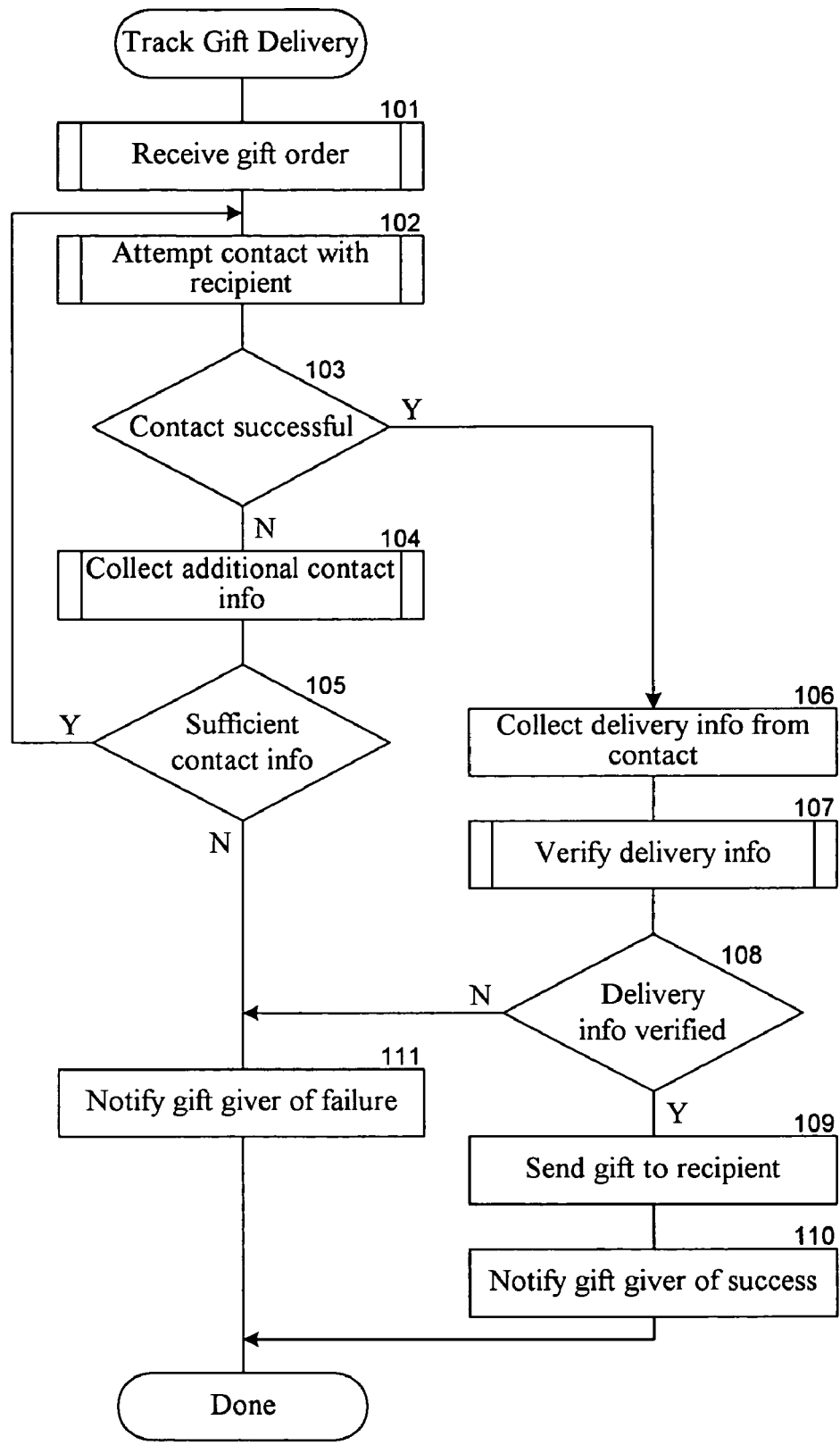
FIG. 1 is a flow diagram of the overall flow of the gift delivery system.

FIG. 1 is a flow diagram of the overall flow of the gift delivery system. In step 101, the gift delivery system receives the order for a gift from a gift giver. In one embodiment, the order is received via access through a Web page, but may also be received via other modes of communication, such as a voice telephone call, postal mail, facsimile, or electronic mail. In step 102, the gift delivery system attempts to contact the recipient of the gift. The gift order may specify contact information for the recipient, such as an electronic mail address or a telephone number of the recipient. Based on the contact information provided with the gift order, an attempt via electronic mail or an automated voice telephone call is made to initially contact the recipient and gather sufficient delivery information. Alternatively, a person may attempt to make a voice telephone contact with the recipient. In step 103, if the initial contact is successful, then the system continues at step 106, else the system continues at step 104. In step 104, the system attempts to collect additional contact information. The system can obtain the additional contact information through various database sources using the information provided with the gift order. For example, the system can use the recipient's name or the recipient's electronic mail address to access Internet-based database systems. In step 105, if the system obtains additional contact information from these additional sources, then the system loops to step 102 to attempt to contact the recipient using the additional contact information, else the system continues at step 111. In step 106, the system collects delivery information from the successful contact. For example, if the successful contact is a phone call, the operator making the phone call preferably enters the delivery information. If the successful contact is an electronic mail exchange, the system preferably parses the recipient's reply message to collect the delivery information. In step 107, the system verifies that the delivery information is correct. The system may use various databases, which contain lists of all proper street addresses, to verify the address. In step 108, if the delivery information is verified, then the system continues at step 109 to send the gift to the recipient, else the system continues at step 111. In step 109, the system sends the gift to the recipient. In step 110, the system sends an electronic mail to the gift giver providing notification that the gift has been sent successfully. In step 111, if sufficient delivery information could not be gathered or the delivery information could not be verified, then the system sends a message (e.g., via electronic mail) to the gift giver providing notification that the gift could not be delivered and is being placed on hold.

In an additional embodiment (not shown), if an attempt to contact the recipient is unsuccessful in step 103, then the system attempts to obtain additional delivery information for the recipient from sources other than the recipient, such as databases and other sources similar to those discussed below in conjunction with FIG. 8. If the system is able to obtain sufficient delivery information for the recipient in this manner, the system preferably sends the gift to the recipient using the obtained delivery information.

Figure 2:
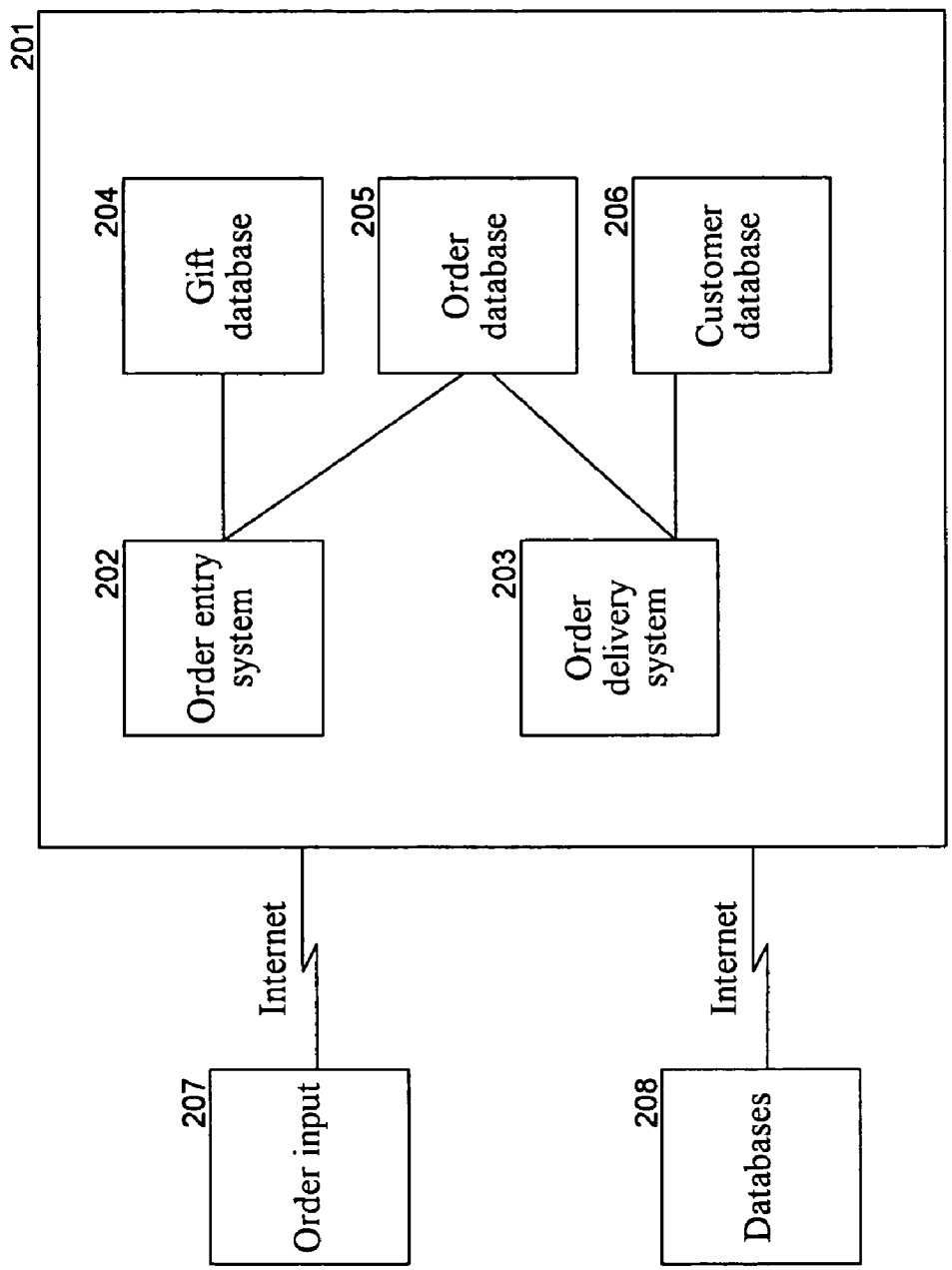
FIG. 2 is a block diagram illustrating the components of the gift delivery system.

FIG. 2 is a block diagram illustrating the components of the gift delivery system. Computer system 201 contains a central processing unit, memory, and peripheral devices, such as a disk drive and CD-ROM. The gift delivery system includes an order entry system 202 and an order delivery system 203. The order entry system provides a user interface for a gift giver to input a gift order. The order entry system in one embodiment comprises a Web page that accesses a gift database 204. The gift giver uses the Web page provided to select which gift should be sent to the recipient. In addition, the gift giver provides information describing the recipient. The order entry system then stores the order information in the order database 205. The gift delivery system controls the locating of additional delivery information so that the gift can be successfully delivered to the recipient. The gift delivery system retrieves information from the order database and attempts to contact the recipient based on the information provided with the gift order. If the recipient cannot be contacted based on that information, then the gift delivery system accesses other database sources, such as the customer database 206 and Internet-based databases 208 to gather additional contact information for the recipient.

Figure 3:
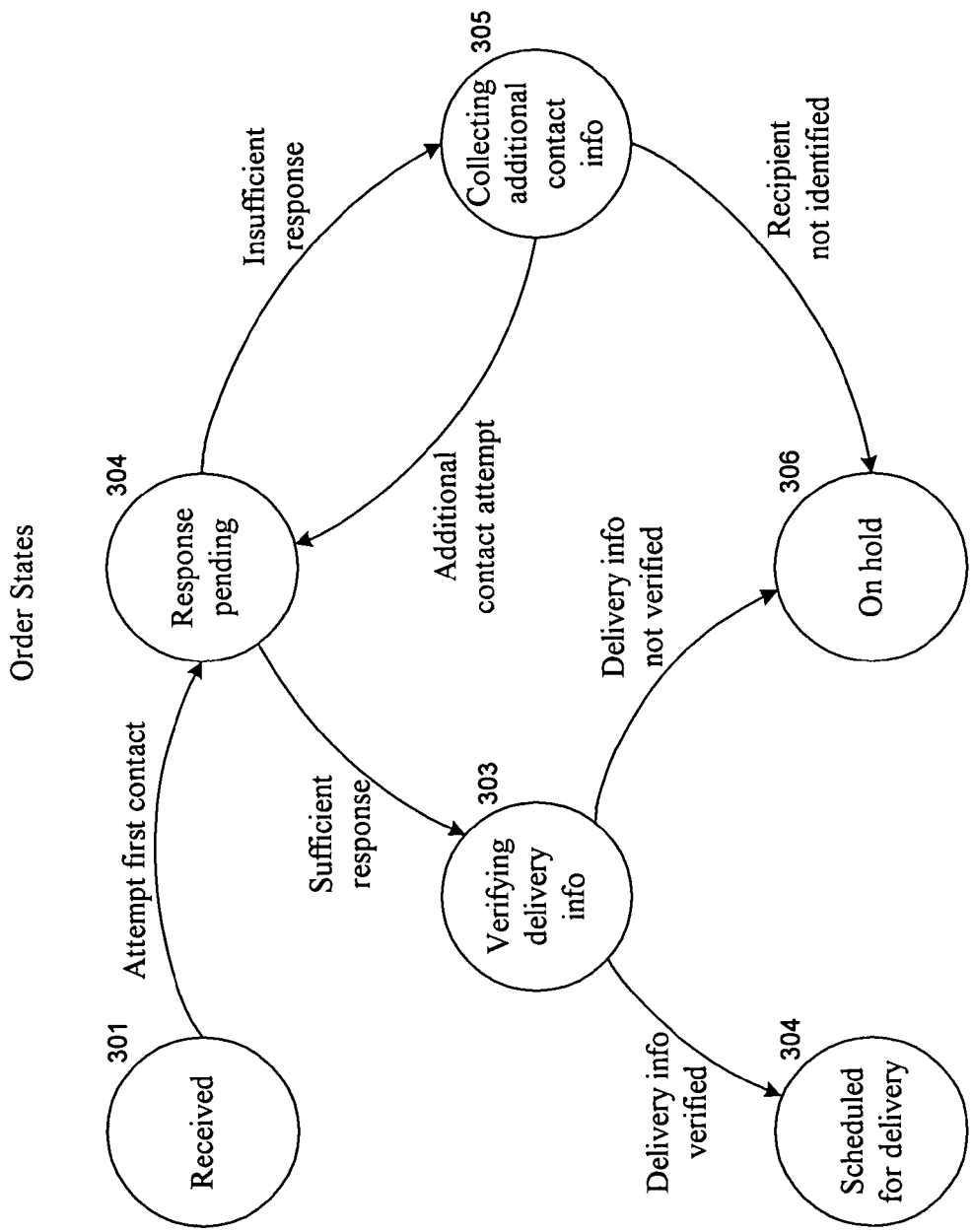
FIG. 3 is a state diagram illustrating the various states of a gift order.

FIG. 3 is a state diagram illustrating the various states of a gift order. A gift order can be in one of six states: received, response pending, verifying delivery information, collecting additional contact information, on hold, and scheduled for delivery. Initially, when an order is received, the system places the order in the received state 301. When the system attempts to contact the recipient using the information provided by the gift giver, the gift order changes to a response pending state 302. The response pending state indicates that the attempt to contact is in progress, but no response has yet been received from the recipient. If a sufficient response is received from the recipient in the allotted time (e.g., 24 hours), then the gift order changes to the verifying delivery information state 303. In the verifying delivery information state, the system attempts to verify that the delivery information is correct. If the delivery address is correct, then the gift order enters the scheduled for delivery state 304. If the initial response was insufficient or not received in the allotted time, then the system places the gift order in the collecting additional contact information state 305. In the collecting additional contact information state, the system searches additional sources of information to determine additional contact information about the recipient.

If additional contact information can be found, then the system attempts an additional contact, and places the gift order in the response pending state 302. If, however, additional contact information cannot be found, then the system places the gift order in the on hold state 306.

In a further preferred embodiment, if the initial response is insufficient, then the system places the gift order in a collecting additional delivery information state (not shown). In the collecting additional delivery information state, the system searches additional sources of information to obtain additional delivery information for the recipient. If the system is able to obtain sufficient delivery information in this manner, then the system places the gift order in the verify delivery information state 303. Otherwise, the system places the gift order in the on hold state 306.

Figure 4:
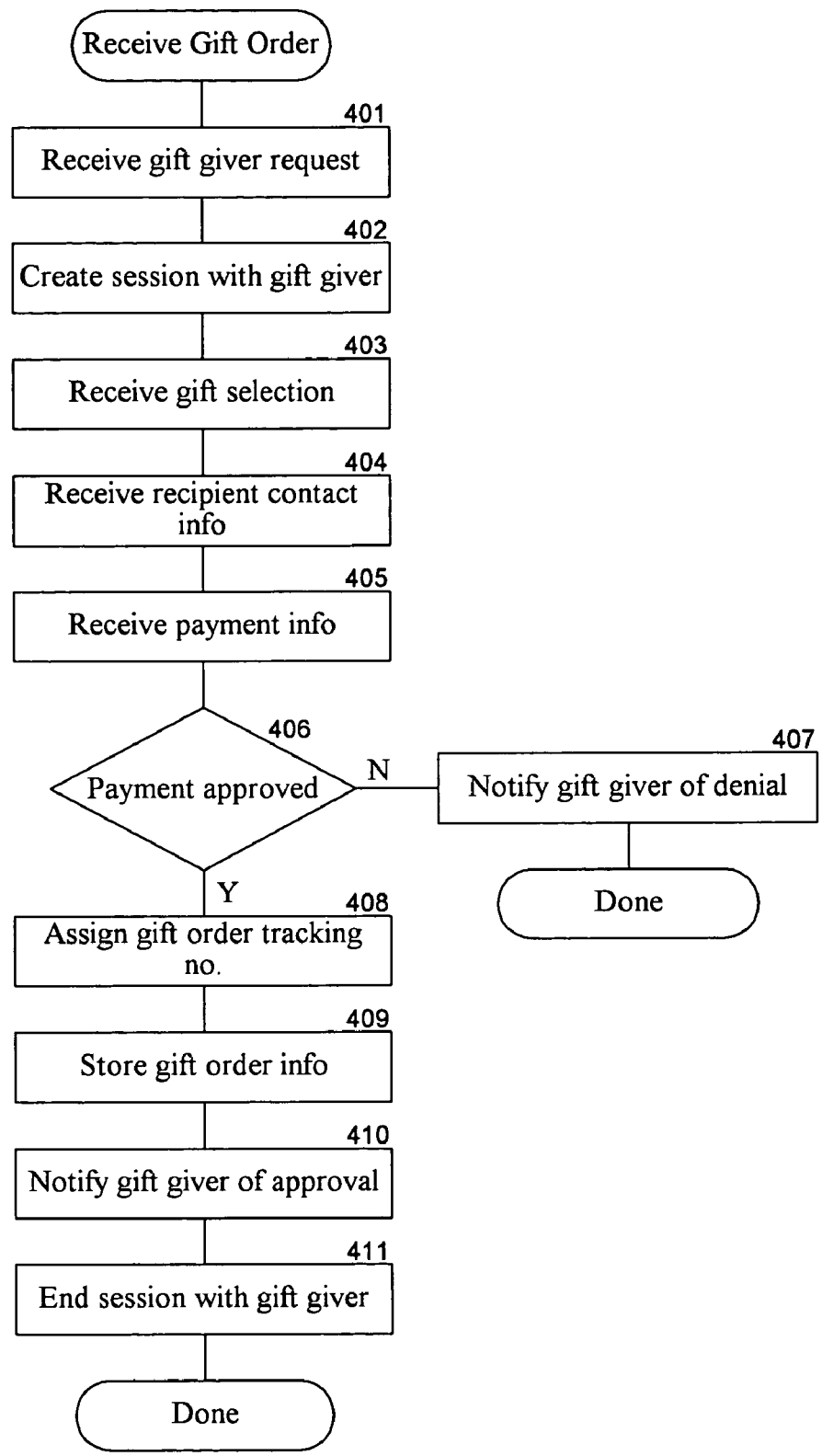
FIG. 4 is a flow diagram of a routine that controls the receiving of a gift order.

FIG. 4 is a flow diagram of a routine that controls the receiving of gift orders. The receive gift order routine controls the interaction with the gift giver to select a gift from the gift database, to receive information on the recipient, to receive the payment, and to store the gift order in a database. This routine processes gift orders received electronically. One skilled in the art would appreciate that similar routines could be developed to handle other forms of receiving gift orders. In step 401, the routine receives a request to send a gift from a gift giver to a recipient electronically via a Web page. In step 402, the routine creates a session with the gift giver. The session is used to track the interaction with the gift giver and the gift delivery system. In step 403, the routine receives the gift selection information. The gift selection information may be selected in response to a display of available gifts from the gift database. In step 404, the routine receives recipient contact information from the gift giver. The recipient contact information may typically include the recipient's name and electronic mail address. In step 405, the routine receives payment information. The payment information may be in an electronic form, such as a credit card, debit card, or digital cash, or in a conventional form, such as check or money order. If in conventional form, the gift order may be placed in an additional state waiting for receipt of the payment. In step 406, if the payment is approved, then the routine continues at step 408, else the routine notifies the gift giver that the payment has been denied. In step 408, the routine assigns a gift order tracking number to the gift order. The gift order tracking number is used by the system to identify the gift order throughout its processing. In step 409, the routine stores the gift order information in the gift order database. In step 410, the routine notifies the gift giver that the gift order has been accepted. In step 411, the routine ends the session with the gift giver.

Figure 5:
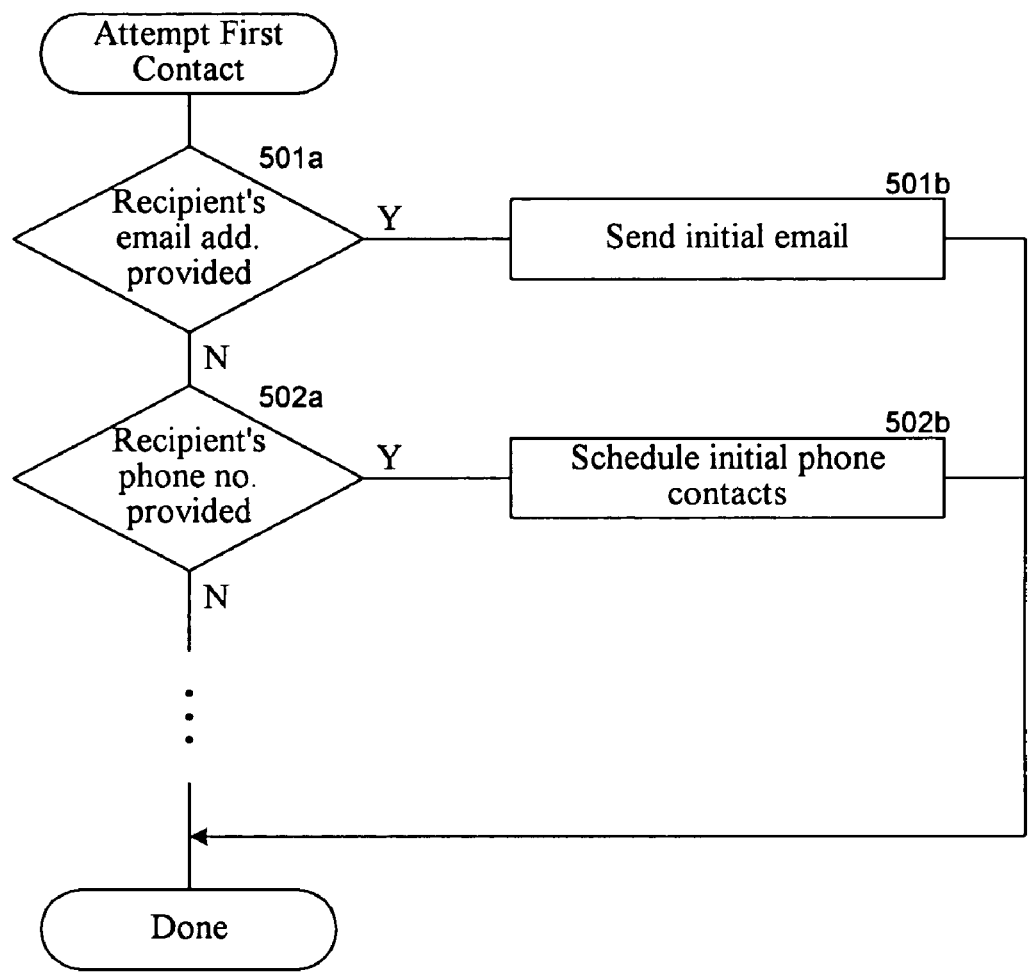
FIG. 5 is a flow diagram of a routine that controls the attempt at first contact to the recipient.

FIG. 5 is a block diagram of a routine that controls the attempt at first contact of the recipient. The first contact is made with contact information provided by the gift giver, such as electronic mail address and telephone number. If sufficient information is not provided to even attempt to contact the recipient initially, the gift delivery system searches various databases to obtain such information based on the recipient's name. In step 501*a*, if the recipient's electronic mail address has been provided in the gift order, then the routine continues at step 501*b*, else the routine continues at step 502*a*. In step 501*b*, the routine sends an electronic mail to the electronic mail address provided. The electronic mail contains information indicating that a gift is to be sent to the recipient and requests delivery information for the gift. The electronic mail includes the tracking number assigned by the system so that when a reply mail is received, the gift delivery system can determined to which gift order it corresponds. In step 502*a*, if the recipient's phone number has been provided, then the routine continues at 502*b*, else the routine continues various other attempts to contact the recipient. For example, if a facsimile number was provided, a facsimile message is sent to the number. In step 502*b*, the routine schedules an initial telephone contact with the recipient. The initial telephone contact could be via an automated voice telephone system in which a message is left with the person answering the phone or with an answering machine. Alternatively, a human operator may make the initial voice contact. After the initial contact is made, the gift order is placed in response pending state.

Figure 6:
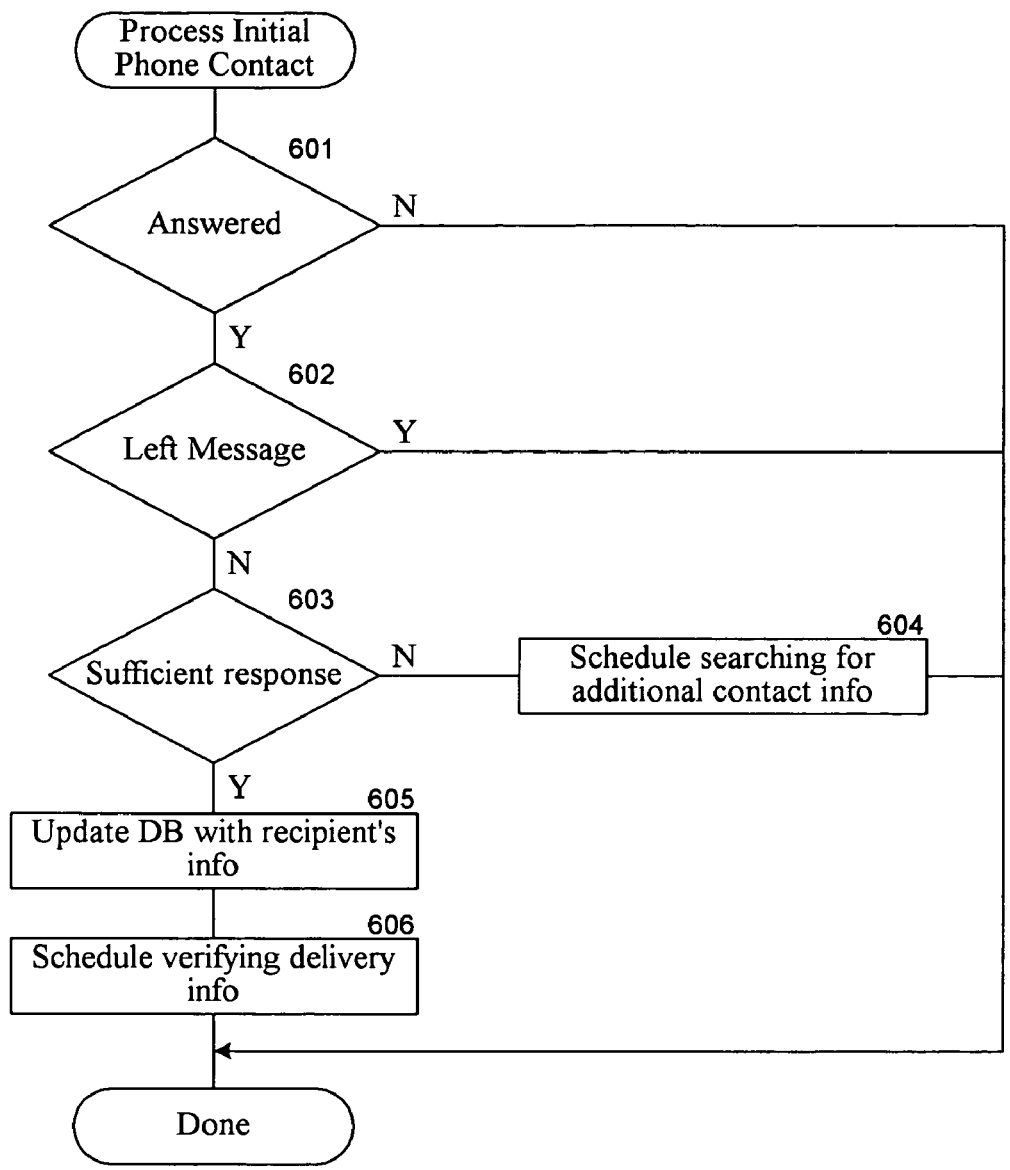
FIG. 6 is a flow diagram of a routine that controls the processing of the initial voice telephone contact.

FIG. 6 is a flow diagram of a routine that controls the processing of the initial voice telephone contact. This routine can either display information for a human operator or provide information to an automated operator. In step 601, if the telephone has been answered, then the routine continues at step 602, else the routine leaves the gift order still scheduled for initial contact. In step 602, if a message is left either with a person or a voicemail system, then the routine continues at step 603, else the routine leaves the gift order still scheduled for initial contact. In step 603, if a sufficient response has been received, then the routine continues at step 605, else the routine continues at step 604. In step 604, the routine schedules the gift order for searching for additional contact information relating to the recipient. In step 605, the routine updates the order database with the additional information about the recipient. In step 606, the routine schedules the gift order to have its delivery information verified and changes its state to verifying delivery information.

Figure 7:
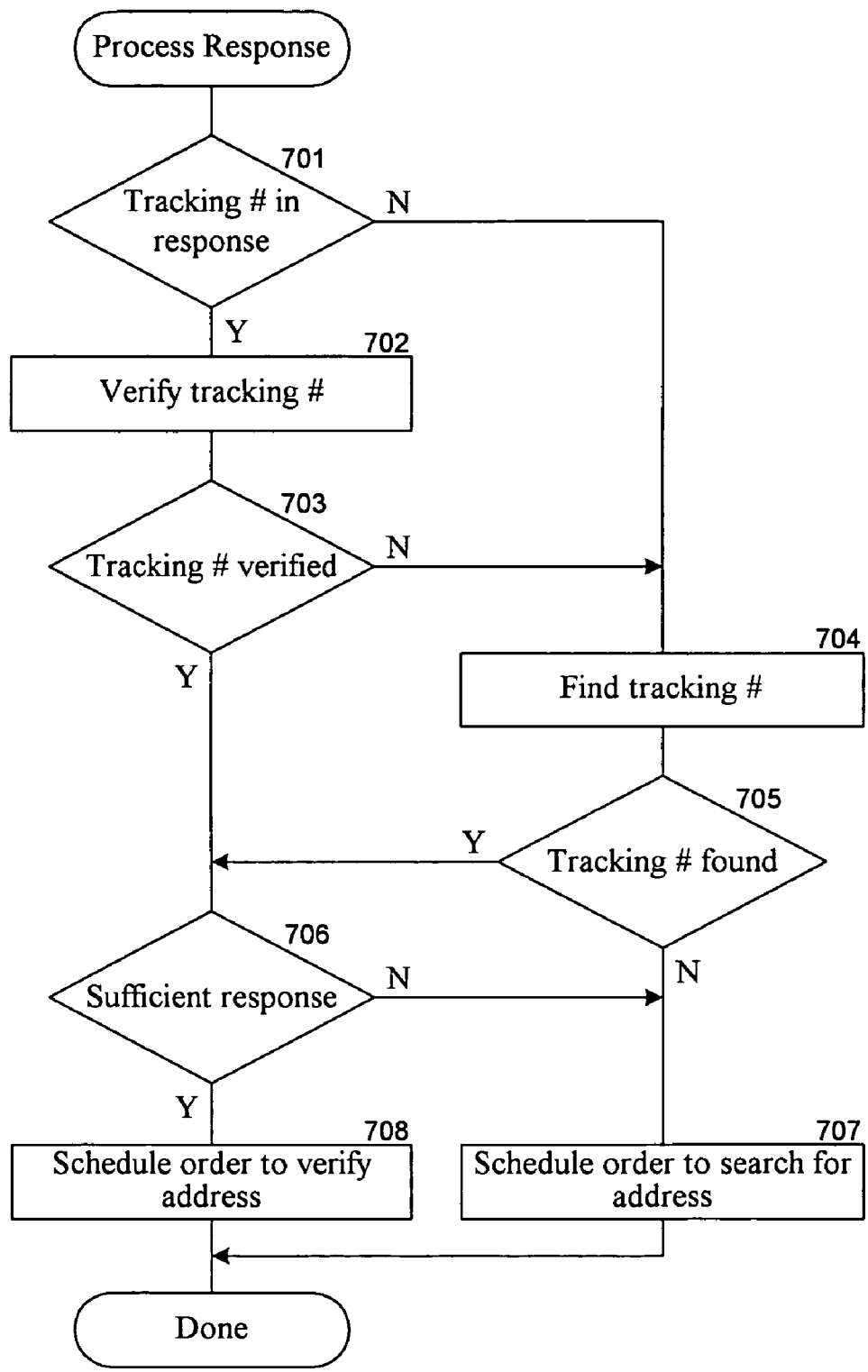
FIG. 7 is a flow diagram of a routine that controls the processing of the initial response.

FIG. 7 is a flow diagram of a routine that controls the processing of the initial response. The initial response can be via electronic mail, voice telephone, or facsimile message. In step 701, if the tracking number is included in the response, then the routine continues at step 702, else the routine continues at step 704. In step 702, the routine verifies the tracking number using the gift order database. In step 703, if the tracking number has been verified, then the routine continues at step 706, else the routine continues at step 704. In step 704, the routine attempts to find the tracking number based on the information provided in the response. In step 705, if the tracking number can be found, then the routine continues at step 706, else the routine continues at step 707. In step 706, if the response contains sufficient delivery information so that the gift order can be delivered, then the routine continues at step 708, else the routine continues at step 707. In step 707, the routine schedules the order for searching for additional delivery information. In step 708, the routine schedules the order to have its delivery information verified and changes its state to verify delivery information.

Figure 8:
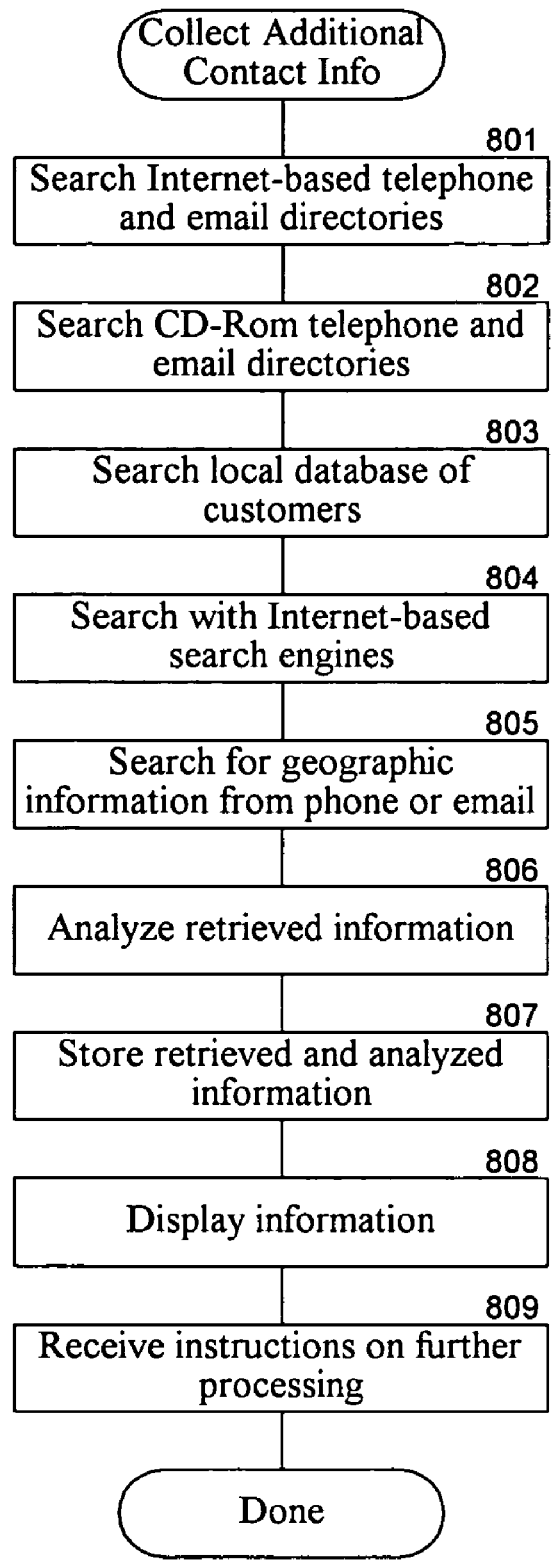
FIG. 8 is a flow diagram of a routine that controls the collecting of additional contact information.

FIG. 8 is flow diagram of a routine that controls the collecting of additional contact information. This routine searches various database sources based on the information provided in the gift order. For example, in step 801, the routine searches Internet-based telephone and electronic mail directories, such as Switchboard, Four11, and Accumail. In step 802, the routine searches various CD-ROM databases of telephone and electronic mail information, such as SelectPhone. In step 803, the routine searches the local database of customer information. The local database of customer information contains information of previous recipients and gift givers. In step 804, the routine searches various Internet-based search engines, such as Digital Equipment's Alta Vista or Infoseek's Ultraseek. In step 805, the routine uses the electronic mail address or telephone number to identify the geographic location of the recipient. In particular, the routine accesses the InterNIC Registration Services of Network Services for the domain name registration of the recipient's electronic mail address. Alternatively, the routine accesses the standard table of area codes and telephone number prefixes to determine the geographic locale of the recipient. The gift delivery system can use each of these information sources, a subset of these information source, or additional information source to locate the additional information. In step 806, the routine analyzes the retrieved information to determine the information that most likely corresponds to the recipients based on geographic or contextual matches. This analysis may be done electronically or interactively with a human operator. In step 807, the routine stores the retrieved and analyzed information and the gift order database.

In step 808, the routine displays the information to a human operator and requests instructions on further processing. The instructions can either be to place the order on hold because sufficient delivery information has not been collected, send an initial contact to the recipient, or proceed with delivery of the gift.

Figure 9:
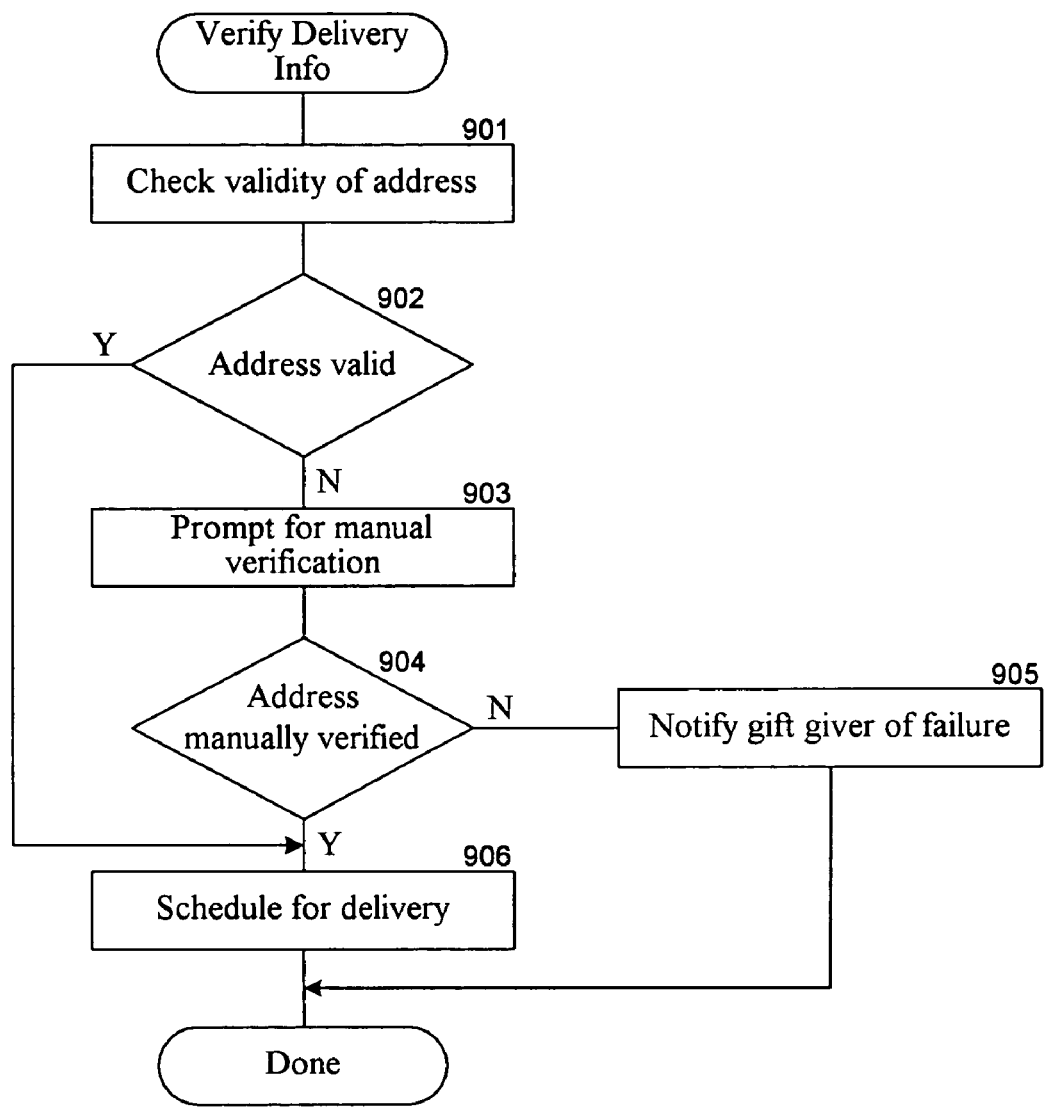
FIG. 9 is a flow diagram of a routine that controls the verifying of the delivery information.

FIG. 9 is a flow diagram of a routine that controls the verifying of the delivery information. The gift delivery system verifies the delivery information to ensure that the gift is being sent to a deliverable address. In step 901, the routine checks the validity of the delivery information automatically. The routine uses a database of U.S. Postal Service addresses to determine whether the delivery address is a valid U.S. Postal Service address. In step 902, if the address is valid, then the routine continues at step 906, else the routine continues at step 903. In step 903, the routine prompts a human operator for manual verification of the address. In step 904, if the operator has manually verified the address, then the routine continues at step 906, else the routine continues at step 905. In step 905, the routine notifies the gift giver that the order cannot be fulfilled and places the order on hold. In step 906, the routine schedules the gift for delivery and notifies the gift giver accordingly.

Although the present invention has been described in terms of a preferred embodiment, it is not intended that the invention be limited to these embodiments. Modifications within spirit of the invention will be apparent to those skilled in the art. The scope of the present invention is defined by the claims that follow.

What is claimed is:

1. A method in a computer system for coordinating delivery of a gift given by a gift giver to a recipient, the method comprising:
   receiving an order from the gift giver, the order identifying the gift to be delivered to the recipient and including an electronic mail address of the recipient, wherein the gift giver is separate from the recipient;
   sending an electronic mail message addressed to the electronic mail address included in the received order, the electronic mail message requesting delivery information;
   receiving the requested delivery information; and
   directing delivery of the identified gift in accordance with the received delivery information.

2. The method of claim 1 wherein the electronic mail message includes an order tracking identification.

3. The method of claim 2 wherein the order tracking identification is received with the requested delivery information.

4. The method of claim 1 including notifying the gift giver of delivery of the gift to the recipient.

5. The method of claim 1 including when the requested delivery information is not received, notifying the gift giver that the gift is not being delivered to the recipient.

6. The method of claim 1 including when the requested delivery information is not received, searching an information source for delivery information associated with the electronic mail address included in the order.

7. The method of claim 6 wherein the information source is an electronic mail database.

8. The method of claim 6 wherein the information source is a local electronic mail database.

9. The method of claim 6 wherein the information source relates to domain name registration of the electronic mail address.

10. The method of claim 6 wherein the information source relates to recipients who previously received gifts.

11. The method of claim 6 wherein the information source relates to gift givers who previously gave gifts.

12. The method of claim 6 wherein the information source is a customer database.

13. The method of claim 1 including sending a web page to the gift giver for entry of the order.

14. The method of claim 1 wherein the computer system is a web server.

15. The method of claim 1 including receiving payment information from the gift giver.

16. The method of claim 1 including verifying whether the received delivery information includes a valid delivery address.

17. The method of claim 16 includes checking a database of valid delivery addresses.

18. The method of claim 17 including, when the delivery address cannot be verified as valid, prompting a person to indicate whether the address is valid.

19. The method of claim 1 wherein the requested delivery information is received via an electronic mail message.

20. A method in a computer system for ordering a gift for delivery from a gift giver to a recipient, the method comprising:
   receiving from the gift giver an information that the gift is to be delivered to the recipient and an electronic mail address of the recipient, wherein the gift giver is separate from the recipient; and
   sending to a gift delivery computer system an indication of the gift and the received electronic mail address wherein the gift delivery computer system coordinates delivery of the gift by
   sending an electronic mail message addressed to the electronic mail address of the recipient, the electronic mail message requesting that the recipient provide delivery information for the gift; and
   upon receiving the delivery information, directing delivery of the gift in accordance with the received delivery information.

21. The method of claim 20 including receiving notification from the gift delivery computer system of the delivery of the gift to the recipient.

22. The method of claim 20 wherein the indication that the gift is to be delivered and the electronic mail address of the recipient are received via a web page.

23. The method of claim 20 wherein the web page is received from the gift delivery computer system.

24. The method of claim 20 wherein the electronic mail message includes an order tracking identification.

25. A method in a computer system for coordinating delivery of a gift given by a gift giver to a recipient, the method comprising;

sending to the gift giver a web page that allows the gift giver to identify a gift;

receiving from the gift giver an identification of a gift;

sending to the gift giver a request for contact information for the recipient of the gift;

receiving from the gift giver an electronic mail address of the recipient, wherein the gift giver is separate from the recipient;

sending to the recipient an electronic mail message addressed to the electronic mail address of the recipient, the electronic mail message requesting delivery information;

receiving from the recipient the requested delivery information, directing delivery of the identified gift in accordance with the received delivery information; and sending to the gift giver an electronic mail message indicating that the identified gift is being delivered to the recipient.

26. The method of claim 25 wherein when sufficient delivery information is not received from the recipient, sending to the gift giver an electronic mail message indicating that the identified gift is not being delivered to the recipient.

27. The method of claim 25 including sending to the gift giver a notification that an order to send the identified gift to the recipient has been accepted.

28. The method of claim 25 wherein the electronic delivery information includes an order mail message sent to the recipient requesting tracking identification.

29. The method of claim 28 wherein the order tracking identification is received along with the requested delivery information.

30. The method of claim 25 including when sufficient delivery information is not received from the recipient, searching an information source for delivery information associated with the recipient.

31. The method of claim 30 wherein the information source is an electronic mail database.

32. The method of claim 30 wherein the information source is a local electronic mail database.

33. The method of claim 30 wherein the information source relates to previous recipients of gifts.

34. The method of claim 30 wherein the information source relates to previous gift givers.

35. The method of claim 30 wherein the information source is a customer database.

36. A computer-readable medium containing instructions for causing a computer system to coordinate delivery of a gift given by a gift giver to a recipient, by a method comprising:

receiving an identification of a gift;

receiving identification information for the recipient, wherein the gift giver is separate from the recipient;

locating an electronic mail address associated with the identification information;

sending an electronic mail message addressed to the located electronic mail address, the electronic mail message requesting delivery information;

receiving the requested delivery information; and delivering the identified gift in accordance with the received delivery information.

37. The computer-readable medium of claim 36 wherein the electronic mail message includes an order tracking identification.

38. The computer-readable medium of claim 36 including notifying the gift giver of delivery of the gift.

39. The computer-readable medium of claim 36 including notifying the gift giver that the gift is not being delivered.

40. A computer-readable medium containing instructions for causing a computer system to deliver gifts given by gift givers to recipients, by a method comprising:

sending a web page that allows a gift giver to identify a gift;

receiving from the gift giver an identification of a gift;

sending a request for identification information for the recipient of the gift;

receiving identification information of the recipient; wherein the gift giver is separate from the recipient;

when the received identification information is not an electronic mail address, locating an electronic mail address associated with the identification information;

sending an electronic mail message addressed to the electronic mail address, the electronic mail message requesting delivery information;

receiving the requested delivery information;

delivering the identified gift in accordance with the received delivery information; and sending an electronic mail message indicating that the identified gift is being delivered.

41. The computer-readable medium of claim 40 including sending an electronic mail message indicating that the identified gift is not being delivered, when sufficient delivery information is not received.

42. The computer-readable medium of claim 40 including sending a notification that an order to send the identified gift to the recipient has been accepted.

* * * * *